June 1, 1954  H. O. ENGSTROM  2,679,879
SELF-LOCKING NUT
Filed March 1, 1946
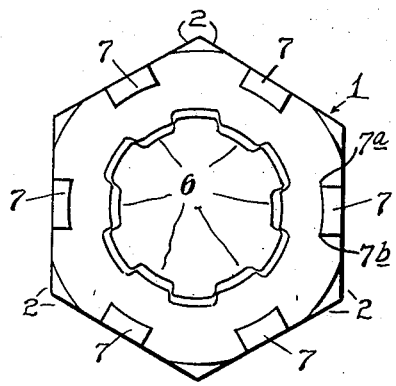
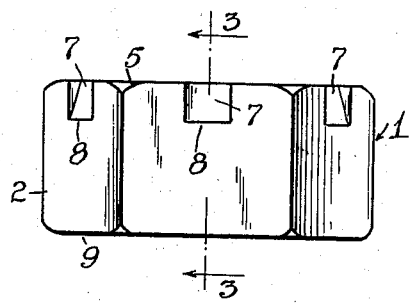
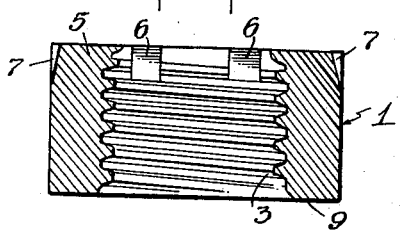
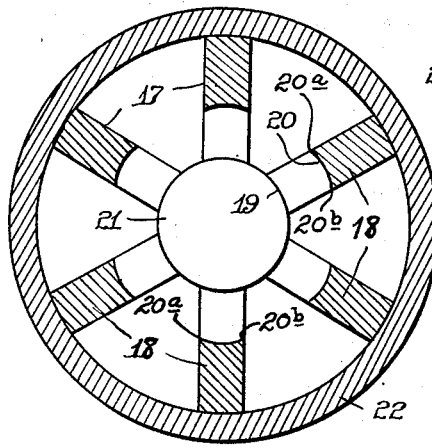
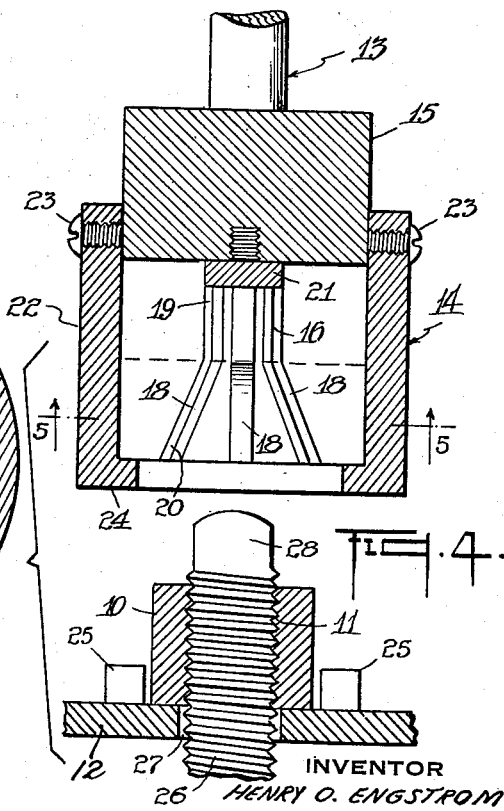
INVENTOR
HENRY O. ENGSTROM
BY
George T. Gill
ATTORNEY Patented June 1, 1954

2,679,879

UNITED STATES PATENT OFFICE 2,679,879

SELF-LOCKING NUT

Henry O. Engstrom, Southport, Conn.

Application March 1, 1946, Serial No. 651,245

1 Claim. (Cl. 151—21)

The invention herein disclosed relates to the art of self-locking nuts and comprehends a self-locking nut.

While many so called self-locking nuts have been proposed, only a few have enjoyed commercial acceptance and these have had but limited application. There are many requirements that a self-locking nut must meet in order to be acceptable. The few which have been found to be commercially acceptable, have had but limited use because they are too expensive for general application. In general, the self-locking nuts heretofore proposed and used require special nut blanks and several forming or assembly operations over and above those required and performed in the manufacture of an ordinary nut.

Many suggestions looking toward the production of an inexpensive lock nut have been proposed. Several such suggestions have as an object the distortion of a portion of the thread of the nut. These suggestions are such that either the thread is discontinuous because of slotting and the like or the distortion is more or less haphazard and uncontrollable. In the former class, extra, expensive operations are required, and in the latter class, the results are unpredictable with wide variations in wrenching torque and frequently distortion and injury of the mating bolt thread.

An object of the invention herein disclosed is to provide an inexpensive lock nut suitable for general application. Another object of the invention is to provide such a self-locking nut that may be manufacured in mass production with reasonable control of the wrenching torque and other characteristics.

The invention is best described and will be better understood from a description thereof as it is embodied in a self-locking nut. Such a nut, constituting one specific example of an embodiment of the invention, is disclosed in the accompanying drawing together with illustrations of certain steps in the method of producing the nut. The drawings include the following figures:

Fig. 1 which is a plan of a self-locking nut embodying the invention;

Fig. 2 which is an elevation of the same;

Fig. 3 which is an axial, sectional elevation of the same taken on the line 3—3 of Fig. 2;

Fig. 4 which is an axial, sectional, fragmentary elevation of a dial press which may be used in carrying out the method of producing the nut; and Fig. 5 which is a bottom plan of the punch shown in Fig. 4 and taken on the line 5—5 of Fig. 4.

The lock nut illustrated in Figs. 1 to 3, is, in general, of the kind that effects a radial gripping action with the thread of a bolt entered through the nut. It has a continuous thread with all portions of equal or substantially equal pitch within the tolerances of the class thereof. The locking action is effected by several portions of the thread extending inwardly beyond the normal diameter of the thread and substantially equally spaced from the axis of the threaded bore of the nut body.

The specific nut illustrated in Figs. 1 to 3 consists of a nut body 1 of hexagonal outer configuration, in accordance with the common practice, to provide six wrench faces 2. The nut body is bored axially and has a continuous thread 3 therein. A portion of the thread, adjacent the end face 5 of the nut body, extends inwardly beyond the normal diameter of the thread. Preferably, there are several such inwardly extending portions 6, angularly and symmetrically disposed about the axis of the nut. Desirably, six such inwardly extending portions are provided, one opposite each wrench face 2, from the standpoint of appearance and performance. At the inwardly extending portions, the thread is continuous and is not spread axially so that it retains, at these points, the same pitch.

For the best performance, i. e. locking characteristics, and for reasonable uniformity in performance between different nuts, it is desirable that the several, two or more, inwardly extending portions 6 exert substantially the same or equal gripping action on the thread of a bolt entered through the nut. To this end, it is desirable that the inwardly extending portions partake of a smooth mating action with the thread of a bolt and be substantially equally spaced from the axis of the threaded bore of the nut body, although this is not necessary for a good locking action. In this way, there is no tilting of the bolt or nut and all portions engage the bolt with substantially equal gripping action.

The inwardly extending thread portions 6 may be formed, as in the nut illustrated, by effecting a radially inward displacement of the metal of the nut body from the outer surface thereof. The displacement effected is permanent and depressions 7 occur in the wrench faces opposite the thread displacement. In the nut illustrated, the displacement effected is greatest at the end face 5 and tapers or inclines from the wrench face at a point 8, intermediate the ends of the nuts and adjacent the end face 5. With such displacements in the wrench faces, the inwardly extending threaded portions extend inwardly gradually over two or three thread convolutions, having their maximum inward extension at the end face 5.

The displacement, to effect the inwardly extending thread portions should be such as to shear the fibers of the metal at the longitudinal demarcations of the displaced portions. This may be effected by a tool having a substantially rectangular face arranged, desirably, to effect a displacement such as illustrated and described. By shearing the fibers of the metal along the spaced longitudinal planes defining the width of the displacement, the displaced portions effecting the inward extensions of the thread have a certain amount of resiliency. This is sufficient to provide enough recovery so that the inwardly extending portions provide an effective locking section when mated with a bolt of maximum thread tolerance and then with one of minimum thread tolerance. In addition, the resiliency permits a displacement such as to provide for maximum and minimum tolerances across the flats of ordinary commercial nuts.

It is possible in effecting the thread displacement to provide a slight downward tilt of the thread at the displaced portions. Such a downward tilt may serve to avoid axial centering of the thread of the nut with respect to the thread of a bolt and effect a thread engagement in the direction of the thread engagement when the nut is drawn home with the engaging face 9 against an abutment.

Depending upon the specifications to be met, the lock nut above described may be made in different manners. In certain industries, notably the aircraft industry, a higher standard of performance is required than in other industries, for example, the automotive industries. In general, however, the specifications, insofar as locking characteristics are concerned, require that the nut have a certain range of torque in inch pounds on the first application and a minimum wrenching torque after a specified number of removals, and that the nut withstand, without loosening or failure a certain vibration and impact over a certain period. These requirements are not as severe in the automotive industry, for example, as they are in the aircraft industry.

Lock-nuts suitable for, and having the characteristics to meet the specifications for use on automobiles and aircraft may be made in accordance with this invention by a single operation on a preformed, ordinary commercial nut. That is to say, an ordinary commercial nut is first made and then transformed into a lock nut. The bored and threaded nut may constitute the nut blank in the formation of a lock-nut of this invention. This is highly advantageous, from a commercial standpoint, as the economy of the highly developed equipment for, and the methods of making ordinary commercial nuts may be utilized in forming lock-nuts.

An ordinary commercial nut 10, that is a nut blank formed, bored and threaded in the manner of ordinary commercial nuts, and of the same height, is illustrated in Fig. 4 of the drawing. The nut is bored and has a thread 11 therein. Such a nut, which may be purchased in quantity on the open market may serve as a nut blank in making lock-nuts in accordance with this invention. In accordance with the invention, inwardly extending thread portions, as above described, are formed in the nut blank to produce the lock-nut described above. Any number, within reason, of inwardly extending thread portions may be provided. Desirably, from the standpoint of performance and appearance two or more are provided and symmetrically disposed about the axis of the nut, and, preferably, with an ordinary nut, there is one for each wrench face of the nut.

In Figs. 4 and 5, there is illustrated a tool which is adapted to be used on a dial press for forming the displacements 7 which effect the inwardly extending thread portions 6. Such presses are well known in the art and articles such as the nut 10 are hopper fed on to a horizontal dial 12 which indexes about a vertical axis and pauses at positions with the article beneath a vertically reciprocated punch 13. In the press shown, the punch 13 is fitted with a tool, designated generally by the numeral 14, for effecting six, angularly spaced displacements in the nut blank 10. It will be appreciated that nut blanks, such as the nut 10, are readily hopper fed to the dial of the press as it is immaterial at which end of the blank the displacements 7 are effected.

The tool 14 consists of a circular, metal block 15, bored axially to provide a central bored portion 16 and milled radially to provide six, equiangularly spaced slots 17. In each such slot 17 there is fitted a displacement finger 18. Each displacement finger includes a straight portion 19, coinciding with the wall of the bored portion 16 and a displacing edge 20, inclined to and diverging from the axis of the bored portion. Desirably, the working or displacing edges 20 of the displacement fingers make an angle of ten degrees with respect to the axis of the tool, a twenty degree included angle. The displacement fingers are held in proper radial position and in the slots by an inner circular plug 21 screwed into the block 15 and extending into the bored portion 16, and an outer circumferential collar 22 secured to the block 15 by set screws 23. The collar 22 has an inturned flange 24 which maintains the displacement fingers in the slots.

As clearly illustrated in the drawing the displacing edge of each displacing finger is concaved transversely to provide shearing edges 20a and 20b. As the metal is sheared by these edges and the locking section inwardly inclined, the shear planes on the nut, notably 7a and 7b extend inwardly, as shown, beyond the median or center 7c of the outer surface of the locking portion.

A nut, such as the nut 10, is held and positioned on the dial by a clamp 25. As the dial 13 indexes to bring the nut beneath the punch, the punch moves downwardly a definite amount. Upon the downward movement of the punch, the displacement fingers engage the end of the nut and cause the displacements, shearing the fibers of the metal in doing so, which effects the inwardly extending thread portions 6. The punch then retracts, the dial indexes to discharge the nut thus acted upon and to bring another nut blank beneath the punch.

A nut so made has locking characteristics better than those necessary to meet the specifications for lock-nuts for use on automobiles and may be made such as to meet the more exacting requirements for use on aircraft. The operation, above described, for forming the locking section on the nut blank is a simple operation that is performed rapidly, automatically and inexpensively. The lock nut so formed is of the same length as an ordinary nut, has substantially equal pull strength and does not require bolts of extra length.

For certain purposes, it may be desirable to control the inward displacement of the inwardly extending threaded portions. In such cases, an undersized threaded mandrel may be threaded through the nut when the tool effects the inward displacements. In this operation, a dial press is provided with a threaded mandrel 26 which, when the nut stops at the station beneath the punch, extends through an opening 27 in the dial and is threaded through the nut. The threaded mandrel has a thread thereon comparable to the thread of the nut but undersized in pitch diameter. Desirably, a pilot 28 is formed on the end of the mandrel and engages in the circular bore 16 of the tool to center the tool and mandrel. Upon downward movement of the tool, the metal is displaced as above described to effect the inwardly extending threaded portions against the mandrel. Upon upward movement of the punch, the mandrel is withdrawn and the dial indexes.

For certain other purposes, and particularly for relieving the thread of a bolt on which the nut is first threaded from the action necessary to effect initial movement of the inwardly extending threaded portions, the nut may be sized after the displacement is effected. In this operation, the displacements are formed to effect the inwardly extending thread portions without a mandrel as first described above. Thereafter, and after the displacement has been effected and the tool withdrawn, the undersized threaded mandrel is threaded through the nut. In this way, a more uniform initial torque, as between nuts is attained. It will be apparent that both operations may be performed successively on the same dial press. This would eliminate handling of the nut blanks.

From the foregoing description of the invention as embodied in the lock nut illustrated in the drawing, it will be apparent to those skilled in the art that by this invention there is provided an inexpensive, satisfactory, all metal, self-locking nut that is suitable for all industries and applications; that is such that it will not injure the thread of a bolt to which it is applied; that is, of the same length as the ordinary nut and does not require added bolt length for equal pull strength; that is interchangeable on different bolts of the same thread and class fit without loss of locking torque; and that may be used repeatedly. It is to be noted that the thread of the locking section, as between a multiplicity of nuts embodying this invention, is of greater accuracy, as to pitch diameter, than the tolerances of the ordinary commercial nuts of the same size and class of thread.

It will be obvious that various changes may be made by those skilled in the art in the details of the lock-nut illustrated in the drawing and described above within the principle and scope of the invention as expressed in the appended claim.

I claim:

A self-locking nut consisting of a nut body of the same length and wall thickness of a like, ordinary, commercial nut of polygonal outer configuration from one end face to the other end face to provide several wrench faces and having an axial bore therethrough and a continuous, unbroken thread therein of like pitch throughout within the tolerances of the class thereof and extending from one end face of the nut body to the other, and a plurality of locking sections at one end of the nut body, each locking section consisting of a radially inwardly distorted portion of the nut body substantially within the confines of a wrench face and defined by spaced shear planes in the outer surface of the nut body parallel to a radial plane of said nut body, spaced apart less than the width of a wrench face and a convex outer surface between said planes, each such locking section gradually extending inwardly beyond the normal diameter of the thread over at least two thread convolutions, having the maximum displacement at the end of the nut body, said convexed outer surface making an angle of approximately ten degrees with the axis of the nut body and having thread sections on the inner surface of each locking section substantially undistorted axially but with the major portion of each said thread section displaced substantially uniformly radially inwardly, whereby the locking action of the locking sections is effected by the radial engagement with a thread of a bolt threaded through the nut body.

References Cited in the file of this patent

UNITED STATES PATENTS

| Number | Name | Date |
| --- | --- | --- |
| Re. 22,243 | Gade | Jan. 5, 1943 |
| 426,185 | Ibbotson | Apr. 22, 1890 |
| 1,083,217 | McClellan | Dec. 30, 1913 |
| 1,903,921 | Rupf | Apr. 18, 1933 |
| 1,903,922 | Rupf | Apr. 18, 1933 |
| 2,299,085 | Gade | Oct. 20, 1942 |

FOREIGN PATENTS

| Number | Country | Date |
| --- | --- | --- |
| 10,396 | Great Britain | 1886 |